United States Patent
Leygues (10) Patent No.: US 9,083,744 B2
(45) Date of Patent: Jul. 14, 2015

(54) USE OF A DISTRIBUTED HASH TABLE TO FEDERATE MANY SMALL-SIZED IMS CORE INFRASTRUCTURES

(75) Inventor: Francois Leygues, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1960 days.

(21) Appl. No.: 12/021,329

(22) Filed: Jan. 29, 2008

(65) Prior Publication Data

US 2008/0181200 A1 Jul. 31, 2008

(30) Foreign Application Priority Data

Jan. 29, 2007 (FR) ...................................... 07 52924

(51) Int. Cl.
- *H04L 12/66* (2006.01)
- *H04L 29/12* (2006.01)
- *H04L 29/06* (2006.01)
- *H04L 29/08* (2006.01)

(52) U.S. Cl.
CPC ...... *H04L 61/1529* (2013.01); *H04L 29/12094* (2013.01); *H04L 67/1065* (2013.01); *H04L 65/1016* (2013.01); *H04L 67/104* (2013.01)

(58) Field of Classification Search
CPC ..................... H04L 29/12094; H04L 61/1529; H04L 67/1065; H04L 67/104; H04L 65/1016
See application file for complete search history.

(56) References Cited

U.S. PATENT DOCUMENTS

| 2004/0184452 A1 | 9/2004 | Huotari |
| 2005/0002381 A1* | 1/2005 | Westman et al. ............. 370/352 |
| 2007/0053330 A1* | 3/2007 | Stafford et al. ............... 370/338 |
| 2008/0070543 A1* | 3/2008 | Matuszewski et al. .... 455/404.1 |

FOREIGN PATENT DOCUMENTS

| WO | 1 313 287 A2 | 5/2003 |
| WO | WO 2006/068365 A1 | 6/2006 |

OTHER PUBLICATIONS

"3GPP: Technical Specification group Services and System Aspects; IP Multimedia Subsystem (IMS); Stage 2 (Release 7)", 3GPP, Dec. 2006, pp. 1-25, XP002450773.

K. Singh et al, "Data format and interface to an external peer-to-peer network for SIP location service", IETF Standard-Working-Draft, Internet Engineering Task Force, IETF, CH, May 31, 2006, XP015045369.

* cited by examiner

*Primary Examiner* — Luat Phung
(74) *Attorney, Agent, or Firm* — Harness, Dickey & Pierce, P.L.C.

(57) ABSTRACT

Multimedia subsystem, IMS, containing a set of call session control function elements, CSCF, suitable for sending a signaling message (m) between a first communication client (T) connected to said multimedia subsystem and at least one second communication client, where this second communication client may be connected to said multimedia subsystem or remote and accessible through an interrogating functional element, I-CSCF, and routing methods used to determine a path for the transmission of the signaling message, based on a logical address contained in the signaling message. The multimedia subsystem, IMS, is characterized in that the routing methods implement a distributed hashing table.

19 Claims, 3 Drawing Sheets

FIG_1

FIG_2

FIG_3

FIG_5

USE OF A DISTRIBUTED HASH TABLE TO FEDERATE MANY SMALL-SIZED IMS CORE INFRASTRUCTURES

The invention concerns communication networks and, more specifically, IP Multimedia Subsystems (IMS) as standardized by the 3GPP and the ETSI Tispan.

The IMS architecture is specified by the document TS 23.228 of the 3GPP™, entitled "IP Multimedia Subsystem (IMS); Stage 2 (Release 7)".

The objective of the IMS architecture is to provide a convergence solution between the fixed and mobile infrastructures of the communication networks. This common infrastructure also allows the deployment of known telecommunication services (call transfer, billing, video-conference, etc.) or services yet to come.

Figure 1:
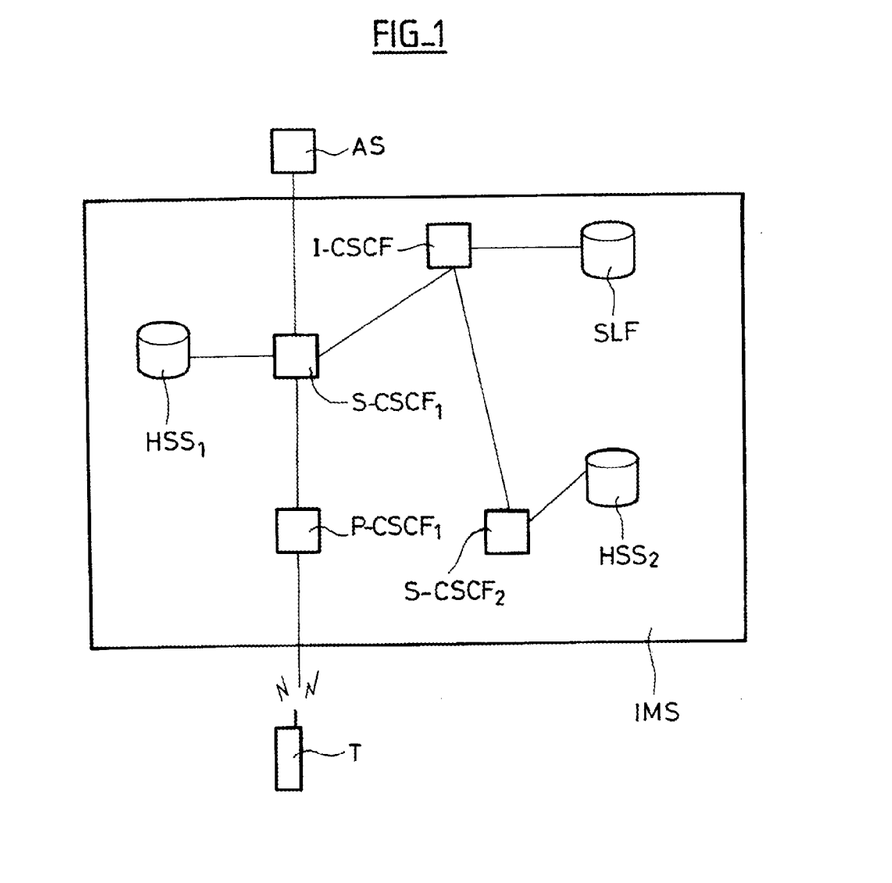
FIG. 1, mentioned previously, represents the IMS architecture.

FIG. 1 shows a simplified IMS architecture. It should be noted that this architecture is functional: the same functional element may therefore be distributed over several network devices and, vice versa, the same network device may carry out several IMS architecture functions.

A multimedia subsystem IMS consists mainly of three CSCF (Call Session Control Function) functions:

The P-CSCF (Proxy CSCF) is the contact point of the communication terminals (or clients) T in the IMS communication network. One of its roles is to authenticate the terminal T and, if necessary, inspect the signaling messages coming from this terminal.

The S-CSCF (Serving CSCF) provides the interface between the application servers AS, and is used to route signaling messages within the IMS communication network, in collaboration with the Home Subscriber Server HSS, coming from or intended for a client connected to this subsystem.

The I-CSCF (Interrogating CSCF) is used to interface with other IMS networks and to route signaling messages from one subsystem to another.

When a communication terminal registers with the IMS communication network, it sends a registration signaling message to an S-CSCF1 functional element through the P-CSCF1 functional element to which it is attached.

This signaling message allows the S-CSCF1 element to add information within the HSS1 subscriber server, connecting the logical address of the user of terminal T (in other words the subscriber to the IMS network) with the identifier of the S-CSCF1 element.

An SLF (Subscription Locator Function) functional element is also affected and memorizes the association between the logical address of the user of terminal T and the HSS1 subscriber server which possesses its information.

Finally, the S-CSCF1 element retains the association between the logical address and the physical address of terminal T.

The S-CSCF1 functional element is also connected to an application server AS which is used to provide subscribers with different telecommunication services: billing, call waiting, re-directing of calls, announcements, audio and/or video conference, etc. The S-CSCF1 functional element is therefore able to analyze the signaling messages in order to contact one or more application servers AS depending on the content.

For an incoming call intended for the client T, the SLF, HSS1 and S-CSCF1 elements are used as a means for associating the logical address contained in the incoming signaling message and the physical address of the client T.

As specified by the 3GPP (3$^{rd}$ Generation Partnership Project) and ETSI (European Telecommunications Standards Institute) standardization bodies, the communication protocol used for the transmission of signaling messages is SIP (Session Initiation Protocol). This protocol is specified in the RFC 3261 of the IETF (Internet Engineering Task Force) and extended upon by subsequent RFCs.

The registration signaling message is therefore normally a SIP "REGISTER" message, and the invitation signaling message is a SIP "INVITE" message.

With the deployment of IMS architectures, the applicant expects an explosion in logical addresses and terminals likely to be connected. In fact, it will become possible to connect a large number of terminals for the same subscriber (computer, fixed line telephone, mobile telephone, personal assistant, television, etc.). It will also be possible to connect devices which are currently usually disconnected from communication networks (household appliances, etc.) in order to provide new services to users.

The subscriber server HSS and above all the subscription location element SLF will then increase considerably in size. They will become bottleneck nodes within the IMS architecture: as they increase in size, they will become more difficult to manage and their access times will also increase, at the expense of the general system performance.

One aim of the invention is to resolve this problem by proposing a distributed architecture.

A distributed approach has already been proposed by the article "Using an External DHT as a SIP Location Service" by Kundan Singh and Henning Schulzrinne, or by the article "Peer-to-peer Internet Telephony using SIP" by the same authors.

The patent request WO2006/068365 presents a similar approach.

Figure 2:
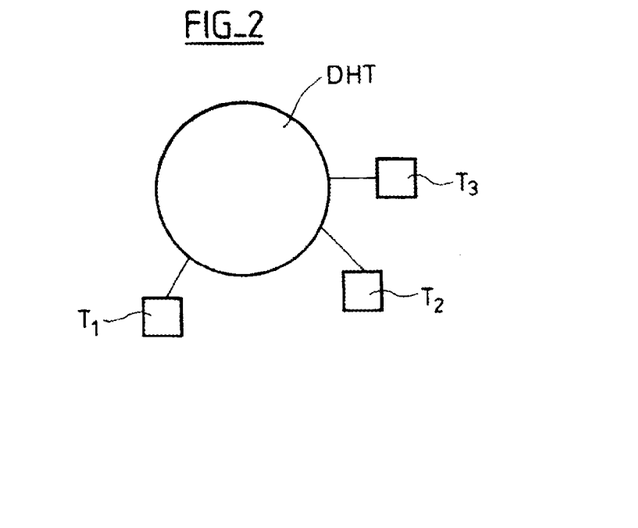
FIG. 2, also mentioned previously, represents a solution for the state of the art.

This approach is illustrated in FIG. 2.

The terminals (or clients) T1, T2, T3 are connected to a Distributed Hashing Table, or DHT. This distributed hashing table plays the role of SIP registrar in a traditional SIP architecture: the associations between logical subscriber addresses and physical terminal addresses are memorized in this distributed hashing table.

Each of the terminals T1, T2, T3 possesses a part of this hashing table. Using the mechanisms of the distributed hashing table, a terminal can obtain a physical address of a terminal based on the logical address of the subscriber it wishes to call.

As the registrar is distributed over multiple terminals, there is no longer congestion within a central subscriber server as in the IMS architecture.

However, this approach is not compatible with the IMS architecture, as specified by the 3GPP and ETSI TISPAN standards.

In fact, the terminals must be modified: they do not interact with a P-CSCF functional element through a standardized interface, but must implement a distributed hashing table DHT and implement a specific protocol.

Another state of the art is provided by the Skype Internet telephony product. The principle is mainly the same but the protocol used is a proprietary protocol and not the SIP protocol.

Since this is a proprietary solution, the terminals must include a module provided by the Skype company, and as previously, they do not interface with a P-CSCF functional element of the IMS architecture.

It is generally accepted that the distributed approach, based on the intelligence of the terminals, and the IMS approach, based on the location of the intelligence in the communication network, are antinomic. For an example, see the participative encyclopedia "Wikipedia" at the address: http://fr.wikipedia.org/wiki/P2P The aim of this invention is to adopt the principle of a distributed architecture to implement the association between logical addresses and physical addresses, but remaining compatible with the IMS architecture. In particular, one of the aims of the invention is to be transparent with regard to the communication terminals.

To do this, the first aim of the invention is a multimedia subsystem, IMS, containing a set of call session control function elements, CSCF, suitable for sending a signaling message between a first communication client connected to said multimedia subsystem and at least one second communication client. The second communication client may be connected to the multimedia subsystem or remote and accessible through an interrogating functional element, I-CSCF. The multimedia subsystem also contains routing methods used to determine a path for the transmission of the signaling message, based on a logical address contained in the signaling message. The multimedia subsystem is characterized in that these routing methods implement a distributed hashing table.

According to a first execution method of the invention, the routing methods contain a subscriber selection functional element, SLF, used to determine the subscriber server HSS associated with the logical address and implemented by a distributed hashing table.

According to a second execution method, the multimedia subsystem, IMS, contains multiple domains, each containing a set of call session control function elements, CSCF. The routing methods contain a federating functional element used to determine one of these domains based on the logical address (contained in the signaling message), and are implemented by a distributed hashing table.

According to an implementation of this execution method of the invention, the serving functional elements, S-CSCF, of at least some of the domains form the distributed hashing table nodes.

At least one domain can be planned so that signaling messages from said first communication client connected to this domain are sent to the interrogating functional element, I-CSCF, of the domain concerned. This interrogating functional element is then itself intended to interrogate the federating functional element in order to determine the path for the signaling messages.

The interrogating functional element can for example implement the functions of a THIG gateway.

The interrogating functional element, I-CSCF, can also be intended, on receipt of a signaling message from the first communication client, to determine whether the recipient communication client determined by the logical address contained in the signaling message is connected to one of these domains, and if not, to send the signaling message outside the multimedia subsystem without interrogating the federating functional element.

The interrogating functional elements, I-CSCF, can on the other hand be intended, on receipt of a signaling message from the first communication client, to systematically interrogate the federating functional element (FF) and, in the absence of a response from this element determining a path, to send the signaling message outside the multimedia subsystem.

The interface between the interrogating functional elements of the domains and the federating functional element can be a Dx interface, implementing the Diameter protocol.

This interface may contain an initial function used to insert an association between the logical address and the domain, and a second function used to determine the domain corresponding to a given logical address.

The logical addresses can contain an identifier corresponding to the multimedia subsystem.

The second aim of the invention is a communication network containing at least one multimedia subsystem, IMS, as described previously.

The third aim of the invention is a federating functional element for a multimedia subsystem, IMS. The multimedia subsystem contains multiple domains, each containing a set of call session control function elements, CSCF. According to this aim of the invention, the federating functional element contains means to determine a domain based on a logical address contained in a signaling message, these means implementing a distributed hashing table.

The serving functional elements, S-CSCF, of at least some of these domains can form nodes of the distributed hashing table.

The federating functional element may have a Dx interface implementing the Diameter protocol.

This interface may contain an initial function used to insert an association between the logical address and domain, and a second function used to determine the domain corresponding to a given logical address.

The fourth aim of the invention is a method for sending a signaling message through a multimedia subsystem, IMS, containing a set of call session control function elements, CSCF, between a first communication client, connected to this multimedia subsystem, and a second communication client which may be connected to the multimedia subsystem or remote and accessible through an interrogating functional element, I-CSCF.

The method includes a stage for the determination of a path for sending the signaling message, based on a logical address contained in this signaling message.

The method is characterized in that this stage implements a distributed hashing table.

According to a first execution method, the method contains a stage for the determination of a subscriber server HSS associated with the logical address; this determination is carried out by a subscriber selection functional element, SLF, implemented by a distributed hashing table.

According to a second execution method, the multimedia subsystem contains multiple domains, each containing a set of call session control function elements, CSCF.

The method contains a stage for the determination of a domain among these multiple domains, based on the logical address; the determination is carried out by a federating functional element implemented by a distributed hashing table.

According to an implementation of this execution method, the serving functional elements, S-CSCF, of at least some of the domains form the nodes of the distributed hashing table.

Furthermore, at least one domain can be planned so that the signaling messages from a communication client connected to this domain are sent to the interrogating functional element, I-CSCF, of the domain. The interrogating functional element can itself be intended to interrogate the federating functional element in order to determine the path for these signaling messages.

The invention also has the aim of a software product implementing this method in the different possible implementations.

The invention also has the aim of a system containing a domain name server, DNS, and a federating functional element according to the third aim of the invention.

Lastly, the invention has the aim of an interrogating functional element I-CSCF for the domain of a multimedia subsystem, IMS, containing multiple domains, each containing a set of call session control function elements, CSCF, and a federating functional element used to route signaling messages between these domains of the multimedia subsystem.

The interrogating functional element is intended to receive a signaling message from a first client connected to this domain and intended for a second client.

It is characterized in that it is also intended to:

Determine whether the second client is connected to one of the domains of the multimedia subsystem, If this is not the case, to send the signaling message outside the multimedia subsystem without interrogating the federating functional element, and If this is the case, to interrogate the federating functional element in order to determine the path for this signaling message.

The invention, its different implementations and its advantages will appear more clearly in the implementation description which follows, together with the attached figures.

FIRST IMPLEMENTATION

Figure 3:
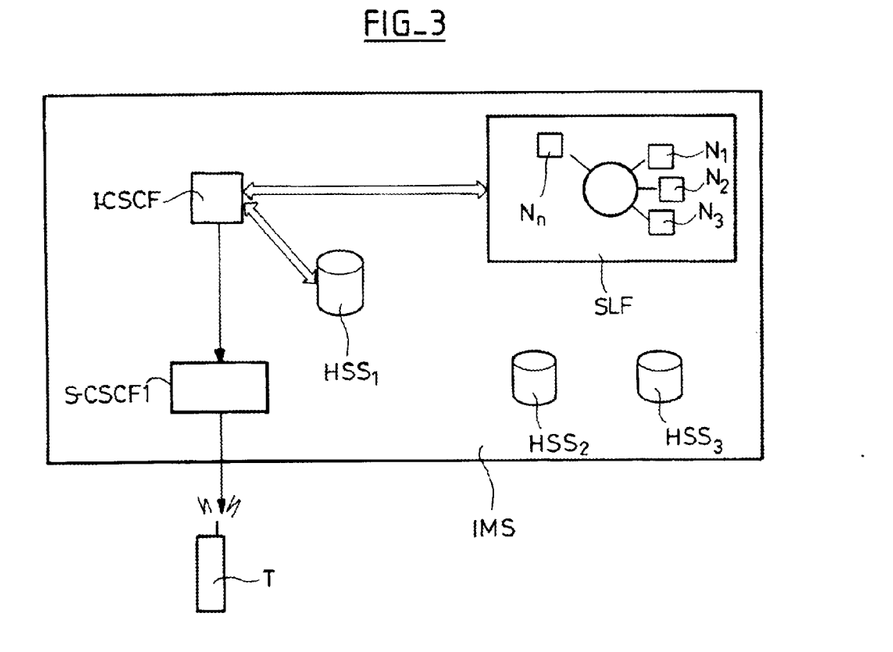
FIG. 3 shows a diagram for a first implementation of the invention.

According to a first implementation of the invention, the subscription location functional element, SLF, is implemented by a distributed hashing table.

The SLF (Subscriber Locator Function or Subscription Locator Function) functional element is a used to determine a subscriber server HSS in a multimedia subsystem IMS which contains several.

This functional element is for example described in the documents TS 29.228 and TS 29.229, respectively entitled "*IP Multimedia (IM) Subsystem Cx and Dx Interfaces; Signalling flows and message contents*" and "*Cx and Dx interfaces based on the Diameter protocol; Protocol details*". These two documents are produced by the 3GPP standardization body and are available on its website.

The SLF functional element is also mentioned in the RFC 4457 of the IETF entitled "*The Session Initiation Protocol (SIP)—P-User-Database Private-Header (P-Header)*", published in April 2006.

This subscriber selection functional element SLF forms part of the routing methods of the multimedia subsystem IMS, in other words of all the technical means used for the resolution of a logical address contained in a signaling message to route it towards the corresponding destination. Other than this SLF element, the routing methods can also include subscriber servers HSS, the serving functional elements S-CSCF, and the domain name servers DNS.

It is possible that one multimedia subsystem IMS may have several subscriber servers HSS. On FIG. 3, three subscriber servers $HSS_1$, $HSS_2$ and $HSS_3$, have been shown.

When the interrogating functional element I-CSCF receives an incoming signaling message (or an incoming call), it must determine how to route this message to the recipient communication client. This is the case, for example, for SIP "Invite" messages aiming to set up a call session. These "Invite" messages, in accordance with the SIP protocol, contain the logical address of one or more recipient subscribers.

To route the "Invite" signaling message to the recipient communication client T, it interrogates the subscriber location functional element SLF, providing in its request the logical address of the recipient contained in the "Invite" signaling message.

This determines a subscriber server identifier associated with this logical address, and sends it in a response message to the interrogating functional element I-CSCF.

Possessing this identifier (its IP address, for example), it can then interrogate the correct subscriber server HSS1, in other words the one which has the information relating to the user subscriber of the communication client T and corresponding to the logical address.

The subscriber server contains associations between logical addresses and identifiers of serving functional elements S-CSCF. By providing the logical address in its request, the interrogating functional element I-CSCF receives in response an identifier of the serving functional element $S\text{-}CSCF_1$ with which the recipient communication client T is registered.

It can then send the "Invite" signaling message to this serving functional element $S\text{-}CSCF_1$. This has the information relating to the communication client T and to the user subscriber of this client.

It in particular has the association between the logical address of the subscriber and the physical address of the communication client T. It can then send the signaling message to the recipient subscriber using the physical address (for example its IP address) of its communication client T.

Furthermore, when a communication client T registers with the multimedia subsystem IMS, information is memorized in the serving functional element $S\text{-}CSCF_1$ to which it is attached, in a subscriber server $HSS_1$ and in the subscriber selection functional element SLF.

It is possible to limit the size of the subscriber servers HSS by scaling them down, but the subscriber location functional element SLF remains a centralized element, the size of which is proportional to the number of subscribers (in other words registered logical addresses).

According to the invention, this subscriber location functional element SLF is implemented by a distributed hashing table. It therefore contains a set of nodes $N_1, N_2 \ldots N_n$ inter-connected between themselves.

The operation of this network of nodes will be explained in more detail below. It is important however that it should have the following as an interface:

a function used to determine a subscriber server HSS based on a logical address; and, a function used to memorize in the distributed hashing table an association between the logical address of the user of the communication client T and the subscriber server $HSS_1$ which has been assigned to it.

This first execution method has the advantage of only modifying the implementation of the subscriber location functional element SLF.

This can retain the same interface and for example a Dx interface compliant with the Diameter protocol. In this way, it can interface with the other functional elements of the multimedia subsystem IMS, without requiring modification of the other elements.

SECOND IMPLEMENTATION

Figure 4:
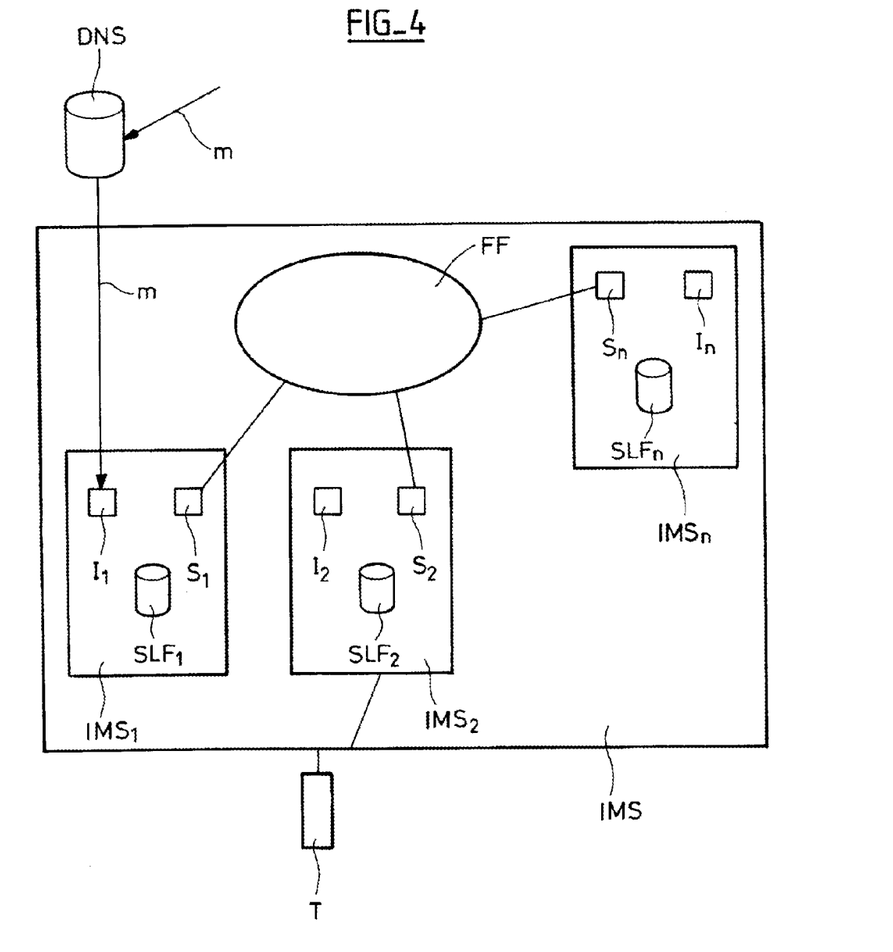
FIG. 4 shows a diagram for a second implementation of the invention.

According to a second implementation of the invention, illustrated by FIG. 4, the multimedia subsystem IMS contains multiple domains, $IMS_1, IMS_2 \ldots IMS_n$. Each domain can be seen as an entirely separate IMS subsystem, having its own call session control function (CSCF) elements:

a serving functional element S-CSCF, respectively $S_1$, $S_2 \ldots S_n$, an interrogating functional element I-CSCF, respectively $I_1, I_2 \ldots I_n$.

(if necessary) a proximity functional element P-CSCF, not shown.

The routing methods contain, as in the previous example, subscriber selection functional elements $SLF_1$, $SLF_2 \ldots SLF_n$; serving functional elements $S_1, S_2 \ldots S_n$; a domain name server DNS; subscriber servers (HSS, not shown).

According to the invention, they also contain a federating functional element FF. This new functional element is used to determine one of the domains $IMS_1, IMS_2 \ldots IMS_n$, based on a logical address contained in a signaling message.

This federating functional element FF is implemented by a distributed hashing table.

Distributed Hashing Table

A distributed hashing table (DHT) is a technology used to memorize and retrieve information in a widely distributed system such as a peer to peer network. In principle, the content of the hashing table is distributed over all the stations or nodes of the network and there is no centralized device.

Such distributed hashing tables are described for example in the article "*Looking up Data in P2P Systems*" by H. Balakrishna, F. Kaashoek, D. Karger, R. Morris and I. Stoica, published in February 2003, in the review Communications of the ACM, vol. 46, no. 2.

The patent request WO2006/068365 mentions some of the principles of the state of the art and proposes a new distributed hashing table approach.

Figure 5:
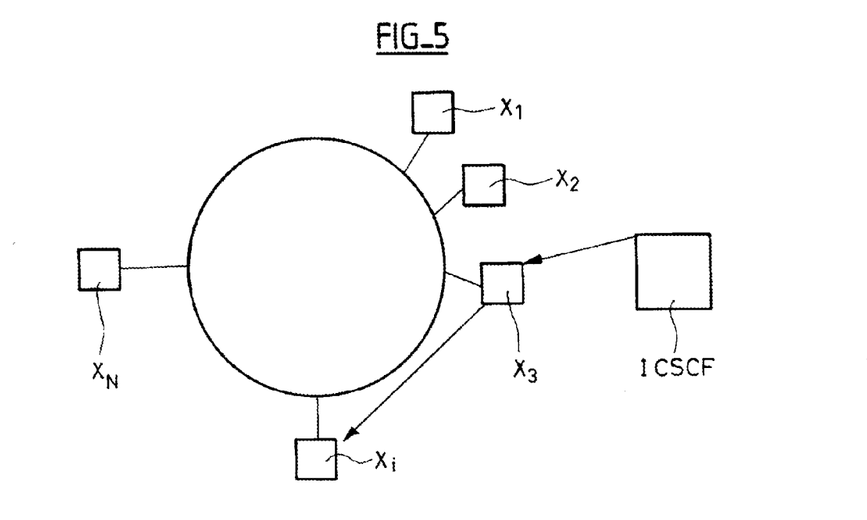
FIG. 5 illustrates the operation of a distributed hashing table.

There are different possible implementations of a distributed hashing table. FIG. 5 shows a simplified example to help understanding, but the invention should not be considered to be limited to this specific implementation.

The set of nodes $X_1, X_2, X_3 \ldots X_N$ of the distributed hashing table DHT plays the same role. In order to memorize or retrieve a value from this table (or network), any of these nodes can be consulted.

In the example of FIG. 5, the interrogating functional element I-CSCF interrogates the node $X_3$, providing it with a logical address.

This then calculates a hashing function on this logical address.

A hashing function is a function used to convert a value belonging to a large set (all possible logical addresses) to a second value belonging to a reduced set. This second value here is an integer between 1 and N, where N is the number of nodes in the distributed hashing table DHT.

The hashing function H should generally respect the following mathematical property: $H(x) \neq H(y) \Rightarrow x \neq y$ Furthermore, if $x=y$ then the probability must be greater/less than $H(x)=H(y)$.

The value i returned by the hashing function indicates to node $X_3$ that node $X_i$ is probably the one which possesses the association between the logical address received and the corresponding domain. It sends the request to this node $X_i$. If this node does indeed possess the association, it can return the domain associated with the logical address. Otherwise, it can send the request to another node (neighbor) which may possess the association.

Iteratively, the algorithm converges to the node which possesses the association.

The principle for the memorization of a new association is similar. Any node of the DHT peer to peer network receives a request for memorization and calculates a value based on the hashing function and the logical address.

This value determines a specific node of the set of nodes of the distributed hashing table DHT, to which the first node resends the request for memorization. The node designated in this way memorizes the association.

According to one execution method of the invention, the nodes of this distributed hashing table are made up of all or some of the serving functional elements $S_1, S_2 \ldots S_n$.

This execution method is used in order not to add a new element within the global architecture, and to use the already defined functional elements. It allows better respect for the current standardization of the multimedia subnetworks IMS.

Preferentially, the federating functional element FF presents a Dx interface which can be used by the other functional elements (serving, S-CSCF, or interrogating, I-CSCF).

This Dx interface can typically implement the Diameter protocol, standardized by the IETF. Two main functions are of use for this interface: a function used to memorize a new association, and a function used to retrieve the value associated with a value provided.

Registration of a New Client with a Domain

When a communication client T registers with a domain of the IMS communication subsystem, information is memorized in the distributed hashing table of the federating functional element FF. This information contains the association between the logical address of the user of this communication client T and an identifier for this domain.

Within the domain itself, the communication client is registered in a known manner and as described previously.

Incoming Call

During an incoming call, a signaling message m is sent to the multimedia subsystem IMS. This signaling message m is typically an "Invite" message compliant with the SIP protocol. It contains the logical address of a called subscriber. It is assumed in the example of FIG. 4 that this subscriber is the user of the communication client T, connected to the domain $IMS_2$.

This address, in accordance with the specifications of the 3GPP and the ETSI TISPAN, is a SIP URI (Universal Resource Identifier).

It can take the form a@x.com. The term "a" identifies the subscriber, while the term "x.com" identifies the multimedia subsystem, IMS.

The association of this term "x.com" with the multimedia subsystem IMS is carried out by the domain name server DNS. It is used to determine a physical address (an IP address, for example) of an entry point to this multimedia subsystem.

Typically, it is intended to take into account service registrations known as "SRV registration", defined by the RFC 2782 of the IETF.

Since the multimedia subsystem according to the invention does not have a unique entry point, all or part of the interrogating functional elements, $I_1, I_2 \ldots I_n$, can be associated with the term "x.com" within the DNS server. This can choose which address to send in a random manner, or according to a heuristic method based on certain criteria such as the load of the different interrogating functional elements, priorities, etc.

In the example of FIG. 4, it is assumed that the domain name server DNS has determined the interrogating functional element $I_1$. The signaling message m is consequently sent to this functional element.

This then interrogates the federating functional element FF.

In its request, it inserts the logical address of the called user (here, "a@x.com").

In response it receives the identifier of the domain with which the terminal used by the called party is connected. This identifier can for example be the physical address (IP) of the interface functional element of the domain in question.

In the example of FIG. 4, this identifier is that of the domain $IMS_2$, and the physical address sent can be that of the interface functional element $I_2$.

The interrogating functional element $I_1$, can then send the signaling message m to the interrogating functional element $I_2$.

The interrogating functional element $I_2$ can then act in accordance with the standardization of the IMS, since the domain $IMS_2$ is a standard multimedia subsystem in itself. The signaling message m can then be routed to the terminal T, used by the called party.

Another situation may arise corresponding to the case in which the terminal T is connected to the domain $IMS_1$. In this situation, the interrogating functional element $I_1$ after interrogation of the federating functional element FF sends the signaling message m directly to its domain $IMS_1$ (more precisely to the serving functional element $S_1$).

Outgoing Call

Returning to the example of FIG. 4, it is assumed now that the communication client (or terminal) T, connected to the domain $IMS_2$, sends a signaling message representing an outgoing call.

The description in fact only applies to the case of an outgoing call from the domain $IMS_2$. The situation in which the called communication client is connected to the same multimedia subsystem $IMS_2$ corresponds to the state of the art in terms of operation of a multimedia subsystem.

In the case of an outgoing call, the signaling message is sent through the domain or multimedia subsystem $IMS_2$ to the serving functional element $S_2$ (if necessary using a proximity functional element P-CSCF, not shown).

This serving functional element $S_2$ can then be intended to interrogate the federating functional element FF in order to determine a path (or route) for this signaling message.

Two scenarios may then arise: the called party may be connected to one of the domains $IMS_1 \ldots IMS_n$, or to another network or multimedia subsystem.

As in the situation of an incoming call, described previously, the federating functional element FF can determine to which domain the called communication client is connected.

According to a first implementation, the serving functional element $S_2$ systematically interrogates the federating functional element FF. If the called party is connected to one of the other domains, the federating functional element determines this and sends an identifier of the determined domain. If the called party is not connected to one of these domains $IMS_1 \ldots IMS_n$, the federating functional element FF does not find its address and sends a specific message which can be interpreted by the serving functional element $S_2$ as meaning that the called communication client is outside the domains $IMS_1 \ldots IMS_n$. This specific message can be an error message or a message containing a specific identifier to indicate the absence of the called communication client in its information base.

It is also possible to plan for the serving functional elements to have means to determine whether or not the communication client forms part of one of the domains $IMS_1 \ldots IMS_n$ without having to interrogate the federating functional element FF.

According to another execution method of the invention, the domain is configured in such a way that all the outgoing signaling messages are sent to the interrogating functional element I-CSCF.

This execution method can for example be implemented by granting the interrogating functional element I-CSCF the functions of a THIG (Topology Hiding Internetwork Gateway). The interrogating functional element I-CSCF then acts as the only interface between the IMS sub-system and the external communication networks. It is also used to mask the internal topology of the IMS with regard to these external networks.

The features of a THIG gateway are specified in the documents TS 24.228 and TS 23.228 of the 3GPP.

In this execution method, it is the interface functional elements which are intended to interrogate the federating functional element.

This interrogation can be systematic: On receipt of the signaling message from the communication client T, the interrogating functional element $I_2$ interrogates the federating functional element FF. This responds either with an identifier of the domain to which the called client is connected, or with a value indicating that the called client is not connected to any of the domains $IMS_1 \ldots IMS_n$.

As mentioned in the previous execution method, the interrogating functional element $I_2$ is intended, on receipt of the signaling message, to determine whether the called communication client (i.e. recipient of the signaling message) is connected to one of the domains $IMS_1 \ldots IMS_n$. These means are independent of the federating functional element, and used to reduce the communications caused by the routing of a signaling message.

To do this, the interrogating functional element $I_2$ can contain a table memorizing all of the communication clients connected to one of the domains.

Alternatively, the determination can be based on a name convention. The logical address of the communication client can depend on the global multimedia subsystem. For example, the address a@x.com means that the terminal "a" is connected to the global domain determined by the domain name "x". With such a convention, it is easy to determine through the interrogating functional elements whether or not this name corresponds to its own name.

If it does not, it means that the client belongs to another network and the signaling message must be routed externally. If the name corresponds, however, it means that the federating functional element must be interrogated and the signaling message must be routed to the domain corresponding to the response given by this federating functional element FF.

This operating method in which all the outgoing signaling messages pass through the interrogating functional element ("THIG" method) has the advantage of only requiring the modification of the interrogating functional elements. In the situation of an incoming call or that of an outgoing call, it is these elements which are responsible for interrogating the federating functional element FF, and therefore only they need to be intended for this purpose and to process the response from the federating functional element FF.

The other functional elements, in particular the serving functional elements, are unchanged.

Such an operating method therefore reduces the impact of this new feature on the global architecture of the communication network, and the cost of its addition.

In all cases, the interrogating functional element ("THIG method") or the serving functional element (other execution method) are intended to determine whether the recipient communication client is connected to one of the domains (whether by its own means, or by interrogation of the federating functional element FF).

If it is not, it sends the signaling message outside the network. Otherwise, it sends it to the domain corresponding to the identifier sent by the federating functional element FF.

This invention is therefore used to federate a smaller set of multimedia subsystems (the domains) to form a larger one.

The global multimedia subsystem IMS can in fact have an interface with regard to the other communication networks which masks its implementation and the fact that it contains multiple domains $IMS_1, IMS_2 \ldots IMS_n$. The federating functional element is therefore used to make the architecture of the multimedia subsystem and its breakdown into multiple domains transparent for the signaling message senders and for the rest of the communication networks.

It then becomes possible to open certain domains—of a reduced size—to management by private operators. For example, a domain can represent a company or a subsidiary of a company and its management can be made the responsibility of an administrator of this company or this subsidiary.

The global multimedia subsystem, federating several domains, can be administered by an operator which guarantees the interface with regard to the external network.

It should also be noted that the two implementations can be combined, so that the subscriber selection functional elements (SLF) contained in each domain $IMS_1, IMS_2 \ldots IMS_n$ are implemented by a distributed hashing table, and that these domains are federated by a federating functional element FF.

From an architectural point of view the federating functional element FF can be integrated with other functional elements. In particular, a block containing the federating functional element FF and the domain name server DNS can be integrated into a single function, forming a system.

The invention claimed is:

1. Multimedia subsystem, IMS, comprising:
multiple domains, each domain containing a set of call session control function elements, CSCF, configured to send a signaling message (m) between a first communication client (T) connected to said multimedia subsystem and at least one second communication client,
a federating functional element (FF) implemented by a distributed hashing table, the federating functional element being configured to,
perform a hashing function on a logical address of the at least one second communication client to determine a hash value, and
route the signaling message to any one of the multiple domains based on the hash value, wherein,
said at least one second communication client is connected to said multimedia subsystem or remote and accessible through an interrogating functional element, I-CSCF, contained in each domain, and
the I-CSCF in each domain is configured to send the signaling message to an I-CSCF of a neighboring domain based on a physical address of an I-CSCF of a domain in which the second communication client is connected.

2. Multimedia subsystem, IMS, according to claim 1, in which serving functional elements, S-CSCF, of at least some of said domains form the nodes of said distributed hashing table.

3. Multimedia subsystem, IMS, according to claim 1, in which at least one domain is intended so that the signaling messages from said first communication client connected to said domain are sent to the interrogating functional element, I-CSCF, of said domain, said interrogating functional element itself being intended to interrogate said federating functional element (FF) in order to determine the path for said signaling messages.

4. Multimedia subsystem, IMS, according to claim 3, in which said interrogating functional element implements the functions of a THIG gateway.

5. Multimedia subsystem, IMS, according to claim 3, in which said interrogating functional element, I-CSCF, is configured, on receipt of a signaling message from said first communication client, to determine whether the recipient communication client determined by the logical address contained in said signaling message is connected to one of said domains, and if not, to send said signaling message outside said multimedia subsystem without interrogating said federating functional element (FF).

6. Multimedia subsystem, IMS, according to claim 3, in which said interrogating functional elements, I-CSCF, are configured, on receipt of a signaling message from said first communication client, to systematically interrogate said federating functional element (FF) and, in the absence of a response from this element determining a path, to send said signaling message outside said multimedia subsystem.

7. Multimedia subsystem, IMS, according to claim 1, in which the interface between the interrogating functional elements of said domains and said federating functional element (FF) is a Dx interface, implementing the Diameter protocol.

8. Multimedia subsystem, IMS, according to claim 1, in which the interface between the interrogating functional elements of said domains and said federating functional element (FF) contains a first function used to insert an association between the logical address and domain and a second function used to determine the domain corresponding to a given logical address.

9. Multimedia subsystem, IMS, according to claim 1, in which said logical addresses contain an identifier corresponding to said multimedia subsystem.

10. Communication network containing at least one multimedia subsystem according to claim 1.

11. Interrogating functional element, I-CSCF, for a domain of a multimedia subsystem, IMS, containing multiple domains, each domain containing a set of call session control function elements, CSCF, configured to send a signaling message (m) between a first communication client (T) connected to said multimedia subsystem and at least one second communication client, and a federating functional element (FF) implemented by a distributed hashing table, the federating functional element being configured to,
perform a hashing function on a logical address of the at least one second communication client to determine a hash value, and
route the signaling message to any one of the multiple domains based on the hash value,
said interrogating functional element being configured to,
receive the signaling message from the first communication client,
determine whether said at least one second client is connected to one of said domains of said multimedia subsystem,
if this is not the case, send said signaling message outside said multimedia subsystem without interrogating said federating functional element (FF), and
if this is the case, interrogate said federating functional element (FF) in order to determine the path for said signaling message, and send the signaling message to an I-CSCF of a neighboring domain based on a physical address of an I-CSCF of a domain in which the second communication client is connected.

12. Interrogating functional element according to claim 11, in which the interface with said federating functional element (FF) is a Dx interface, implementing the Diameter protocol.

13. Interrogating functional element according to claim 11, in which said determination is carried out based on a logical address contained in said signaling message.

14. Interrogating functional element according to claim 13, in which the interface with said federating functional element (FF) contains a first function used to insert an association between the logical address and domain and a second function used to determine the domain corresponding to a given logical address.

15. Interrogating functional element, according to claim 13, in which said logical addresses contain an identifier corresponding to said multimedia subsystem.

16. Method of sending a signaling message through a multimedia subsystem, IMS, containing multiple domains, each domain containing a set of call session control function elements, CSCF, between a first communication client, connected to said multimedia subsystem, and a second communication client, wherein said second communication client is connected to said multimedia subsystem or remote and accessible through an interrogating functional element, I-CSCF, contained in each domain, said method including, performing a hashing function on a logical address of the second communication client to determine a hash value, routing the signaling message to any one of the multiple domains based on the hash value, and sending, by an I-CSCF of a first domain, the signaling message to an I-CSCF of a second domain based on a physical address of the I-CSCF of the second domain in which the second communication client is connected.

17. Method of sending a signaling message, according to claim 16, in which the serving functional elements, S-CSCF, of at least some of said domains form the nodes of said distributed hashing table.

18. Method of sending a signaling message, according to claim 16, in which at least one domain is intended so that the signaling messages from a communication client connected to said domain are sent to the interrogating functional element, I-CSCF, of said domain, said interrogating functional element itself being intended to interrogate said federating functional element (FF) in order to determine the path for said signaling messages.

19. A non-transitory computer-readable medium implementing the method according to claim 16 when it is run on a data processing device.

* * * * *